(12) United States Patent
Varadarajan et al.

(10) Patent No.: US 9,459,664 B2
(45) Date of Patent: Oct. 4, 2016

(54) PORTABLE COMPUTING DEVICE HAVING A MOVABLE STAND

(71) Applicant: INTEL CORPORATION, Santa Clara, CA (US)

(72) Inventors: Krishnakumar Varadarajan, Bangalore (IN); Anand Reddy, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 14/139,967

(22) Filed: Dec. 24, 2013

(65) Prior Publication Data
US 2015/0177784 A1    Jun. 25, 2015

(51) Int. Cl.
G06F 1/16   (2006.01)
H05K 5/00   (2006.01)
H05K 7/00   (2006.01)

(52) U.S. Cl.
CPC ............. *G06F 1/166* (2013.01); *G06F 1/1626* (2013.01)

(58) Field of Classification Search
CPC .. G06F 1/1633; G06F 1/1675; G06F 1/1656; G06F 1/166
USPC .................... 361/679.3, 679.59, 699, 679.56
See application file for complete search history.

(56) References Cited

U.S. PATENT DOCUMENTS

| | | | | |
|---|---|---|---|---|
| 4,895,231 A * | 1/1990 | Yamaguchi | ........... | G06F 1/1616 16/444 |
| 6,016,248 A * | 1/2000 | Anzai | ................... | G06F 1/1626 248/463 |
| 7,859,853 B2 * | 12/2010 | Schmeisser | ........... | G06F 1/1626 361/752 |
| 8,243,427 B2 * | 8/2012 | Fu | .......................... | F16M 11/10 248/688 |
| 8,243,428 B2 * | 8/2012 | Fu | .......................... | F16M 11/10 248/917 |
| 8,767,396 B2 * | 7/2014 | Shindo | ................... | H05K 5/023 361/679.03 |
| 8,964,382 B2 * | 2/2015 | Ashcraft | ............... | G06F 1/1656 361/679.56 |
| 2006/0049327 A1 * | 3/2006 | Chen | ...................... | F16M 11/00 248/371 |
| 2006/0050472 A1 * | 3/2006 | Chen | ...................... | G06F 1/1601 361/679.22 |
| 2006/0146487 A1 * | 7/2006 | Huang | ................... | F16M 11/00 361/679.22 |
| 2007/0062089 A1 * | 3/2007 | Homer | ................... | G06F 1/1616 40/754 |
| 2012/0020019 A1 * | 1/2012 | Chen | ...................... | G06F 1/1656 361/679.59 |

* cited by examiner

*Primary Examiner* — Anthony Haughton
(74) *Attorney, Agent, or Firm* — International IP Law Group, P.L.L.C.

(57) ABSTRACT

A portable computing device includes a body that has a display. A stand is connected to the body. The stand is operable to place the portable computing device in a viewing orientation in which the portable computing device rests on the stand or a carrying orientation in which the stand acts as a handle for lifting the portable computing device. A rotation device connected to the stand assists in positioning the display in a range of angles for viewing convenience.

21 Claims, 12 Drawing Sheets

200A

300

500

600A

600B

600C

PORTABLE COMPUTING DEVICE HAVING A MOVABLE STAND

TECHNICAL FIELD

The present disclosure relates generally to a portable computing device having a body secured to a stand by a rotation device. More specifically, the present disclosure relates to a movable stand for portable computing devices of the type typically referred to as All-In-One computers.

BACKGROUND

All-In-One computers (referred to herein as "AIOs") typically include a display device, system processor, hard drive and other system components in a single, unitary housing. Many AIOs have an attached stand in order to be set up for normal operation. AIO stands typically include a hinge to allow placement of the AIO at different viewing angles relative to the user. The hinge mechanism typically needs to hold the AIO in a steady position.

Stands for AIOs tend to have heavy hinges that restrict the overall portability of the device. Additionally, typical AIO stands are restricted to a relatively few preselected viewing angles. The user experience suffers as most of these designs require users to reach behind the system to set it up at the required angle.

BRIEF DESCRIPTION OF DRAWINGS

The present disclosure will now be described by way of example with reference to the accompanying drawings in which.

DESCRIPTION OF THE EMBODIMENTS

Figure 1:
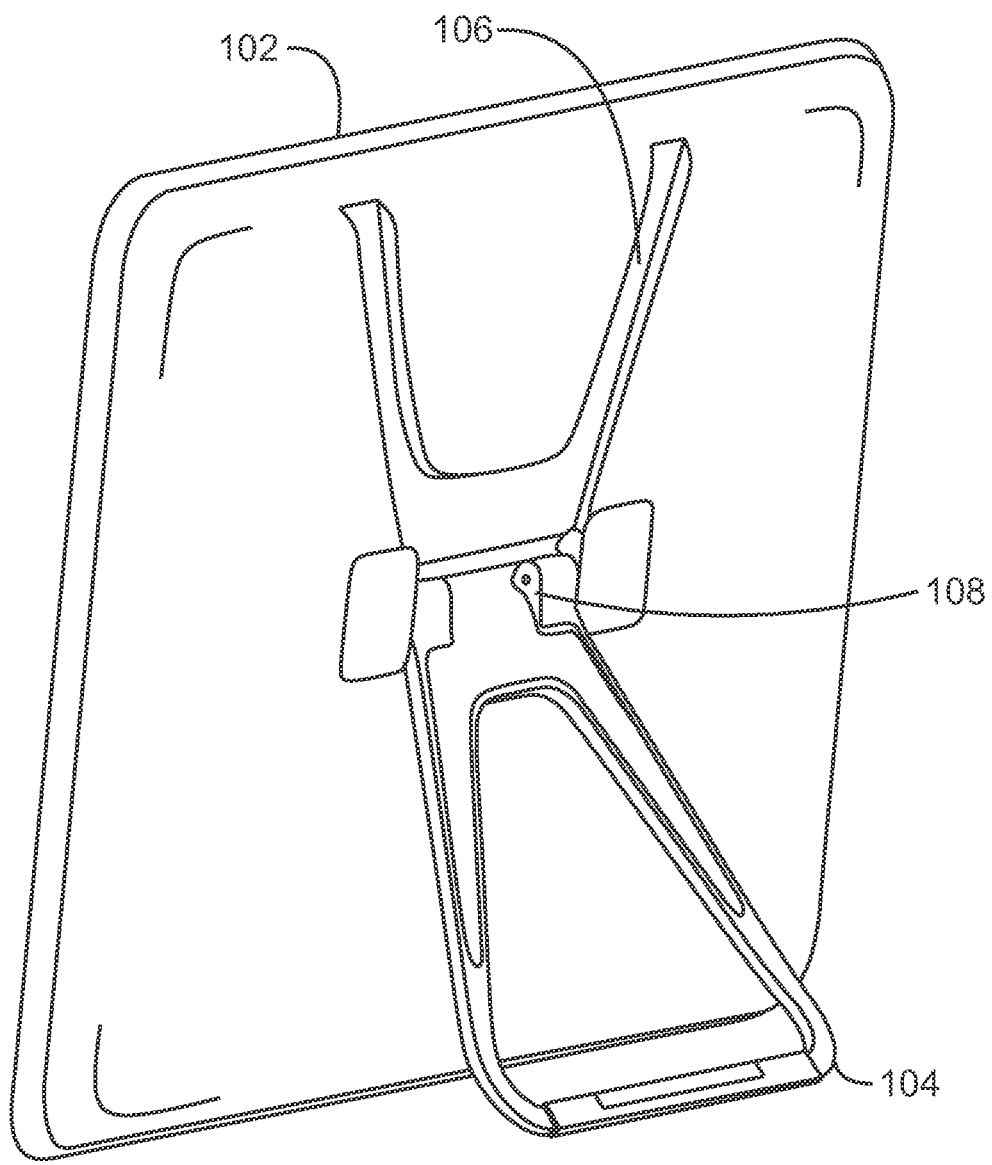
FIG. 1 is a perspective view showing a portable computing device in a viewing orientation in accordance with the subject innovation.

Embodiments of the present disclosure relate to improving the user experience of adjusting the position of a portable computer system such as an AIO. In addition, embodiments may reduce the weight and thickness of such portable computer systems.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a perspective view showing a portable computing device in a viewing orientation in accordance with the subject innovation. The portable computing device is generally referred to by the reference number 100. The portable computing device 100 includes a body 102 that includes a display (not shown in FIG. 1). A stand 104 supports the body 102 so that a user may comfortably view the display. In embodiments, a user is able to position the body 102 by moving (for example, pushing or pulling the body 102), which in turn moves the stand 104. In this manner, the user is able to easily position the display for viewing in a wide range of viewing angles.

The body 102 and the stand 104 may be cooperatively positioned in a viewing orientation (as shown in FIG. 1). In the viewing orientation, the user may conveniently see the display and use the portable computing device 100. Further, the body 102 and the stand 104 may be positioned in a carrying orientation, in which the user is able to lift the portable computing device 100 using the stand 104 as a handle. In this manner, the portable computing device 100 may be moved from one location to another.

The body 102 of the portable computing device 100 includes a recess 106 that is adapted to receive and secure the stand 104. The stand 104 may be secured within the recess 106 when the portable computing device 100 is in the carrying orientation.

In embodiments, the body 102 of the portable computing device 100 houses a rotation device 108 connected to the stand 104 to assist in positioning the display in a range of angles for viewing convenience. The rotation device 108 may include a variety of components such as hinges, sprockets, indexers, mechanical rotation mechanisms, mechanical stoppers and/or one or more motors to assist in positioning the portable computing device 100 in a desirable viewing orientation.

By way of example, the stand 104 may be configured to be placed at an angle, with resolution (tolerance) of about 2°. When positioning the body 102 for effective viewing, movement of the stand 104 may be assisted by, for example, a motor component of the rotation device 108. When adjusted by the user, the stand 104 is secured in place via the rotation device 108. A user action such as attempting to move the body 102 relative to the stand 104 may be detected by a sensor. In response to detecting movement, the rotation device 108 may be placed in a state capable of providing assistance for the motion initiated by the user.

Figure 2A:
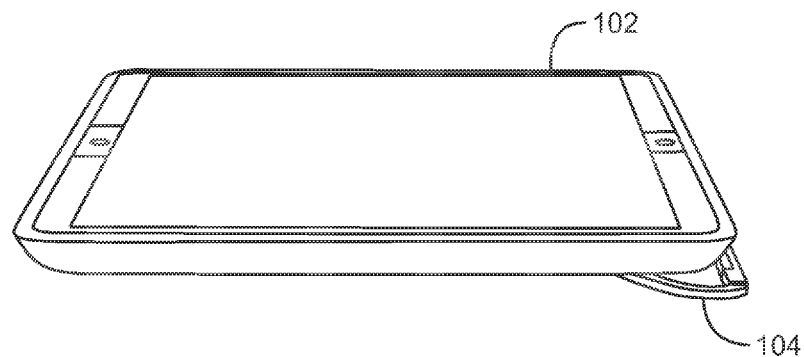
FIG. 2A is a perspective view showing a portable computing device in an interim usage orientation in accordance with the subject innovation.

FIG. 2A is a perspective view showing the portable computing device 100 in an interim usage orientation in accordance with the subject innovation. The view shown in FIG. 2A is generally referred to by the reference number 200A. In the interim usage orientation, the body 102 of the portable computing device 100 is generally on the same plane as the surface that supports the portable computing device 100 (not shown in FIG. 2A). The stand 104 is positioned to slightly elevate one end of the portable computing device 100 for improved viewing by the user. In an embodiment, the interim usage orientation may be used to allow the user to operate the portable computing device 100 as a tablet.

Figure 2B:
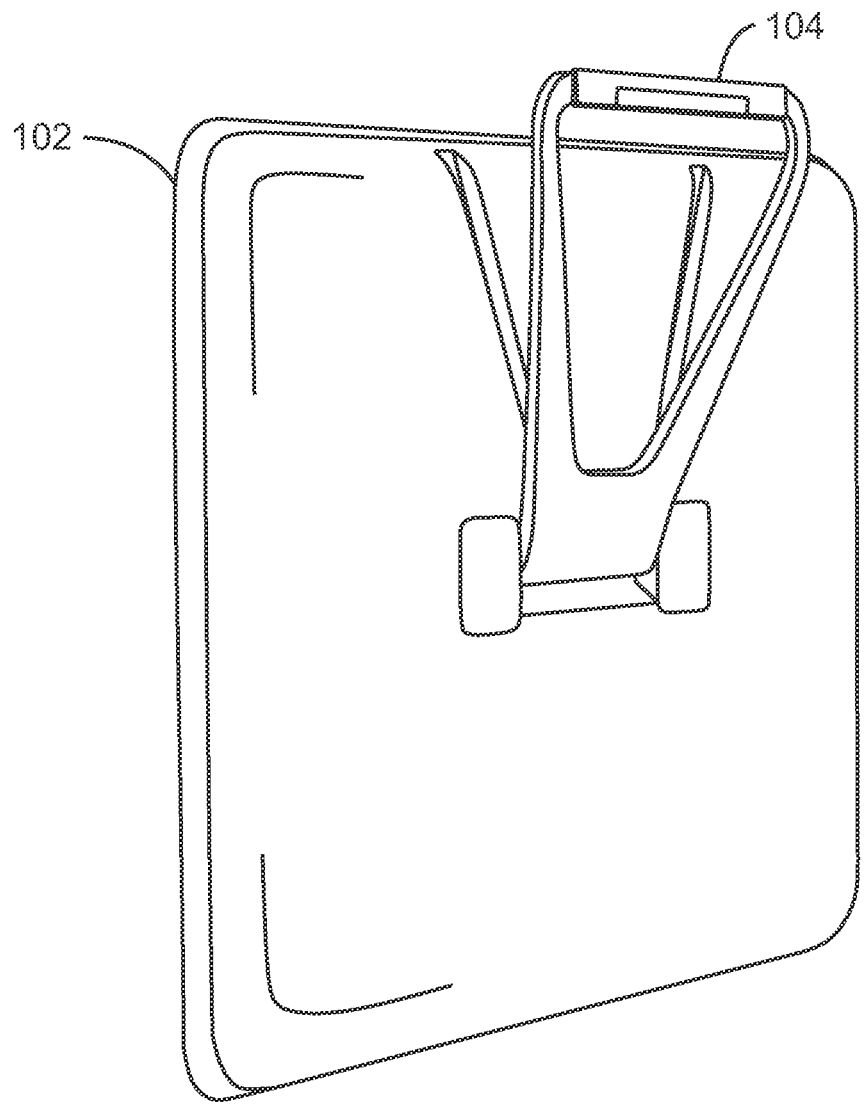
FIG. 2B is a perspective view showing the back of a portable computing device configured in the interim usage orientation shown in FIG. 2A in accordance with the subject innovation.

FIG. 2B is a perspective view showing the back of the portable computing device 100 when configured in the interim usage orientation shown in FIG. 2A. The view shown in FIG. 2B is generally referred to by the reference number 200B. As shown in FIG. 2B, the stand 104 of the portable computing device 100 is positioned adjacent to the recess 106, but not secured within the recess 106. The stand 104 may be held in position by the rotation device 108, which may be configured to prevent motion of the stand 104 until released by a user action.

Figure 3:
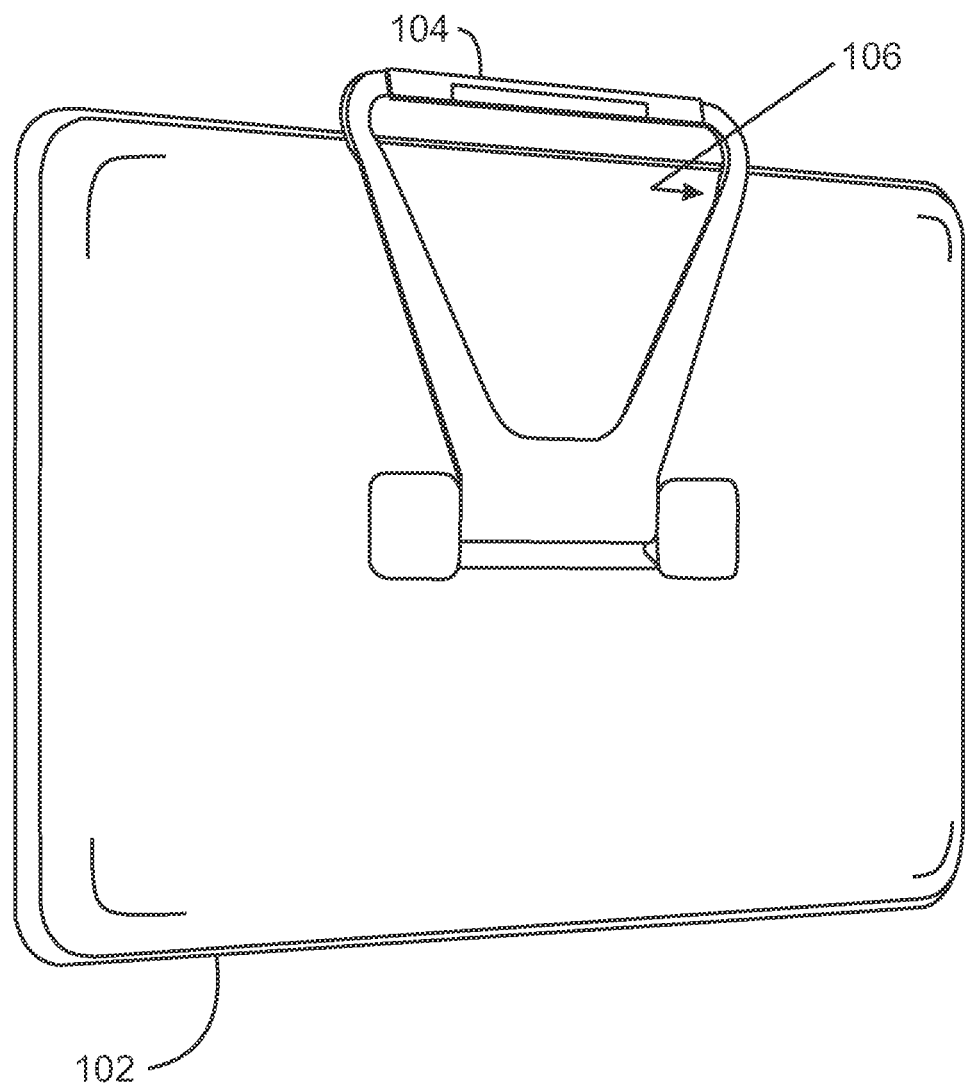
FIG. 3 is a perspective view showing a portable computing device with a carrying orientation in accordance with the subject innovation.

FIG. 3 is a perspective view showing the portable computing device 100 in a carrying orientation in accordance with the subject innovation. The view shown in FIG. 3 is generally referred to by the reference number 300. As shown in FIG. 3, the stand 104 may be secured within the recess 106 of the body 102. This position is referred to herein as a carrying orientation. When in the carrying orientation, the stand 104 of the portable computing device 100 may be used as a handle to move the portable computing device 100 from one location to another location.

Figure 4A:
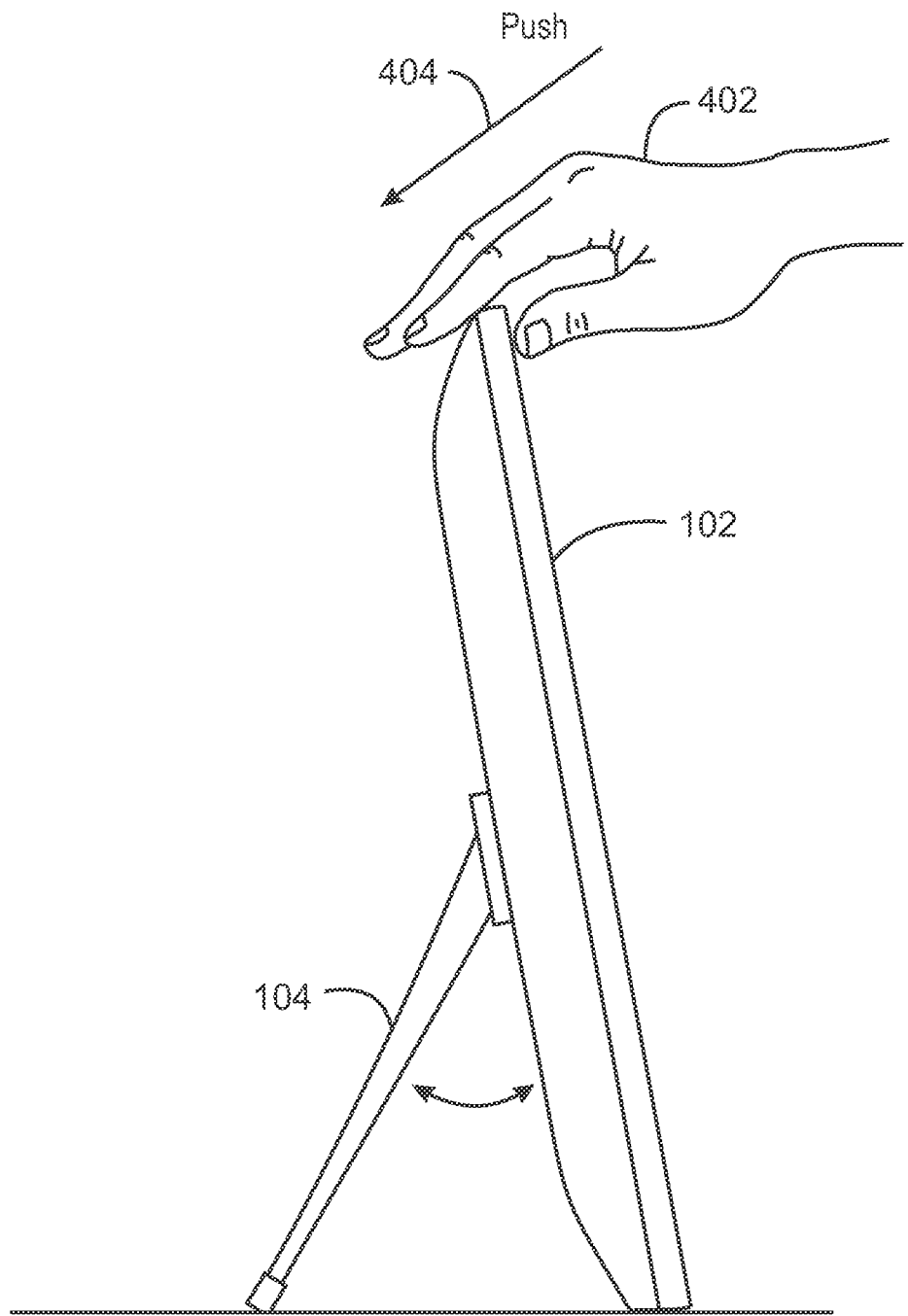
FIG. 4A is a schematic diagram showing the use of the subject innovation in positioning a portable computing device by pushing the portable computing device in a direction away from a user.

FIG. 4A is a schematic diagram showing the use of the subject innovation in positioning a portable computing device by pushing the portable computing device 100 in a direction away from a user. The diagram shown in FIG. 4A is generally referred to by the reference number 400A. As shown in FIG. 4A, a user 402 may reposition the portable computing device 100. The user 402 may adjust a viewing angle of the body 102 of the portable computing device 100 by exerting a force on the body 102. In FIG. 4A, an arrow 404 indicates a pushing force applied by the user 402. The pushing force represented by the arrow 404 causes the stand 104 to move away from the body 102, driven or assisted by the rotation device 108. In this manner, the viewing angle is changed while the portable computing device 100 remains in the viewing orientation.

Figure 4B:
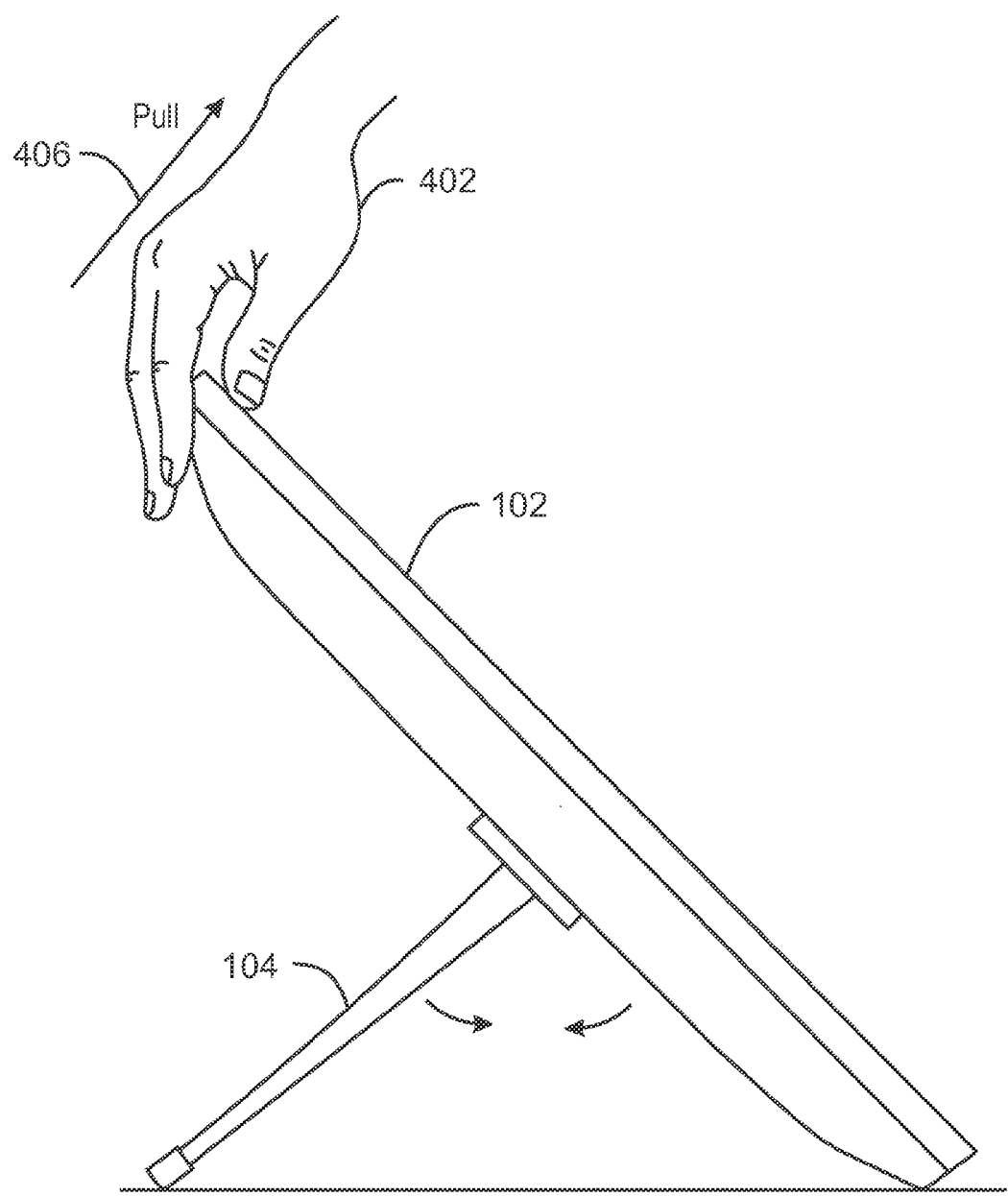
FIG. 4B is a schematic diagram showing the use of the subject innovation in positioning a portable computing device by pulling the portable computing device in a direction toward a user.

FIG. 4B is a schematic diagram showing the use of the subject innovation in positioning a portable computing device 100 by pulling the portable computing device in a direction toward a user. The diagram shown in FIG. 4B is generally referred to by the reference number 400B. As shown in FIG. 4B, the user 402 may reposition the portable computing device 100. The user 402 may adjust a viewing angle of the body 102 of the portable computing device 100 by exerting a force on the body 102. In FIG. 4B, an arrow 406 indicates a pulling force applied by the user 402. The pulling force represented by the arrow 406 causes the stand 104 to move toward the body 102, driven or assisted by the rotation device 108. In this manner, the viewing angle is changed while the portable computing device 100 remains in the viewing orientation.

In embodiments, a micromotor connected to the stand 104 is used to rotate the stand 104 in the desired direction. The sense of direction can be inferred through multiple methods, such as gyroscope sensors, pressure switches on the stand 104, mechanical/electronic switches, or the like.

Figure 5:
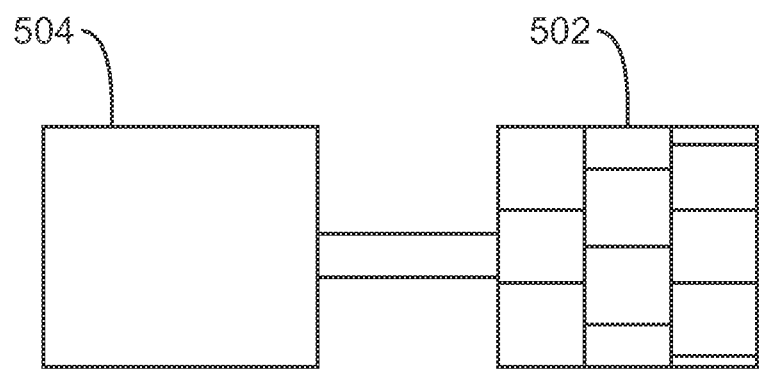
FIG. 5 is a schematic diagram showing a rotation device of a portable computing device in accordance with the subject innovation.

FIG. 5 is a schematic diagram showing the rotation device 108 of the portable computing device 100 in accordance with the subject innovation. The diagram shown in FIG. 5 is generally referred to by the reference number 500. The rotation device 108 includes a mechanical rotation mechanism 502. The mechanical rotation mechanism 502 may include, for example, a ratchet and gear type combination with a mechanical stopper. Another example of the mechanical rotation mechanism 502 is an indexer having holes therealong with a mechanical stopper that stops the rotation of the indexer by engaging the holes. Still another example of the mechanical rotation mechanism 502 is a free wheel with friction caliper stoppers. The operation of the mechanical rotation mechanism 502 is explained further herein with respect FIGS. 6A, 6B and 6C.

In addition, the rotation device 108 shown in FIG. 5 includes a motor 504, which may assist in moving the stand 104 of the portable computing device 100 relative to the body 102. In embodiments, the motor 504 is adapted to assist the motion of the stand 104 relative to the body 102 in response to a user input. For example, the motor may be controlled by a switch. In another example, the motor 504 is controlled electromagnetically based on a user input.

Figure 6A:
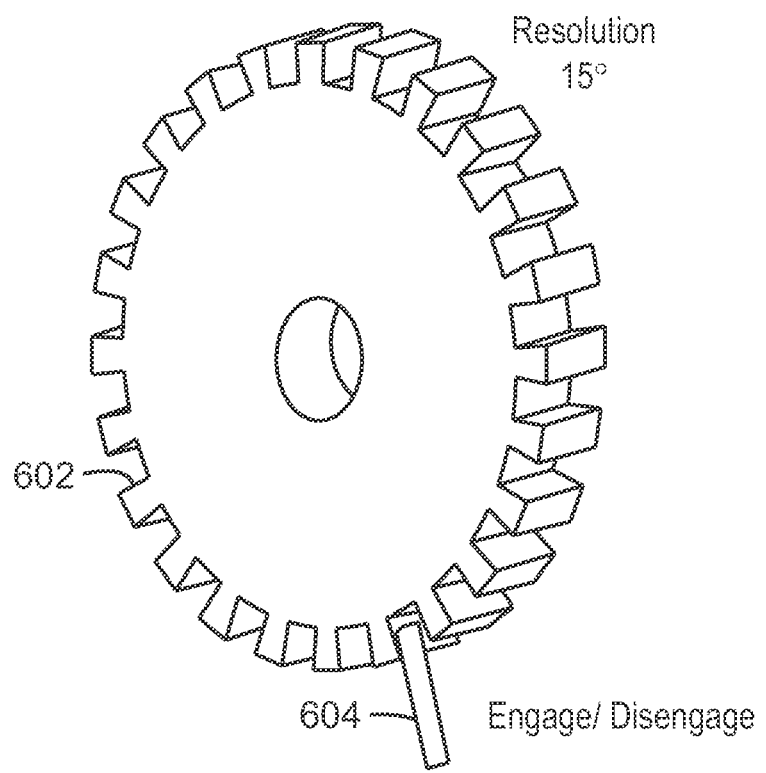
FIG. 6A is a perspective view of a first embodiment of a mechanical rotation mechanism for use with a portable computing device in accordance with the subject innovation.

FIG. 6A is a perspective view of a first embodiment of the mechanical rotation mechanism 502 for use with the portable computing device 100 in accordance with the subject innovation. The view shown in FIG. 6A is generally referred to by the reference number 600A. The mechanical rotation mechanism 502 shown in FIG. 6A includes a sprocket 602 and an engagement mechanism 604. Those of ordinary skill in the art will appreciate that a larger diameter of the sprocket 602 results in the achievement of relatively high resolution angles in systems having a single sprocket. In the embodiment shown in FIG. 6A, the sprocket 602 allows for a resolution of about 15°.

In response to user input, the engagement mechanism 604 is moved away from the sprocket 602, allowing the sprocket to rotate. The engagement mechanism 604 may be moved in and out of position electromechanically. In an embodiment, the engagement mechanism 604 includes a spring damper system. The spring damper system may be engaged and disengaged by user input. A coiled spring of the spring damper system may assist with movement in one direction, while normal motion of the user may assist with motion in the other direction.

Figure 6B:
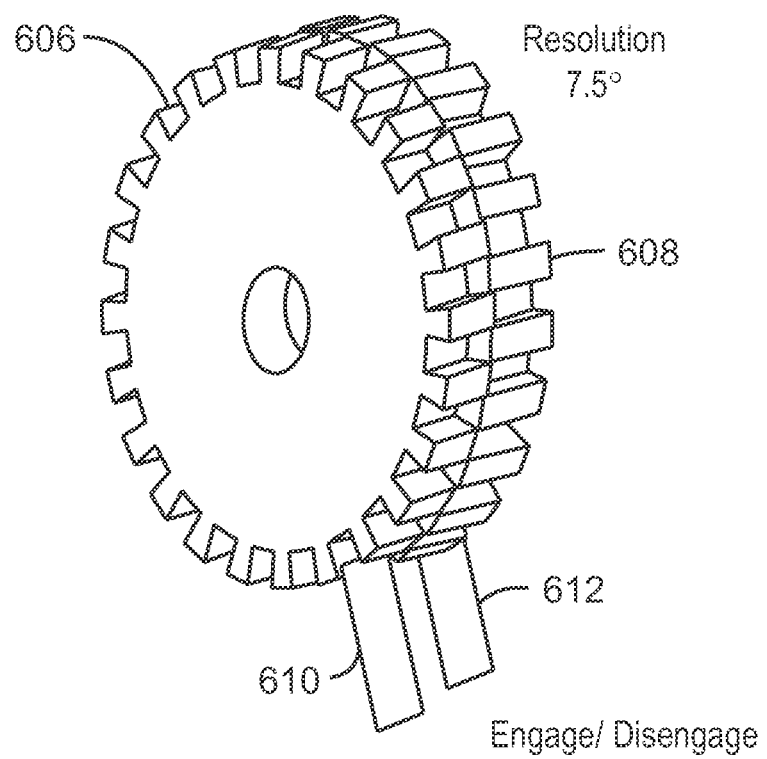
FIG. 6B is a perspective view of a second embodiment of a mechanical rotation mechanism for use with a portable computing device in accordance with the subject innovation.

FIG. 6B is a perspective view of a second embodiment of the mechanical rotation mechanism 502 for use with the portable computing device 100 in accordance with the subject innovation. The view shown in FIG. 6B is generally referred to by the reference number 600B.

The mechanical rotation mechanism 502 shown in FIG. 6B includes a first sprocket 606, which cooperates with a first engagement mechanism 610. A second sprocket 608 cooperates with a second engagement mechanism 612. Those of ordinary skill in the art will appreciate that the embodiment shown in FIG. 6B may allow relatively increased resolution of motion relative to the embodiment shown in FIG. 6A through the use of relatively smaller sprockets. Moreover, multiple sets of sprockets (or ratchets/indexers) may be used to reduce the thickness of the portable computing device 100 by allowing the use of smaller sprockets. The engagement mechanisms may additionally be aligned so as to provide a higher degree of resolution. As with the embodiment shown in FIG. 6A, the embodiment shown in FIG. 6B may be operated by user input.

Figure 6C:
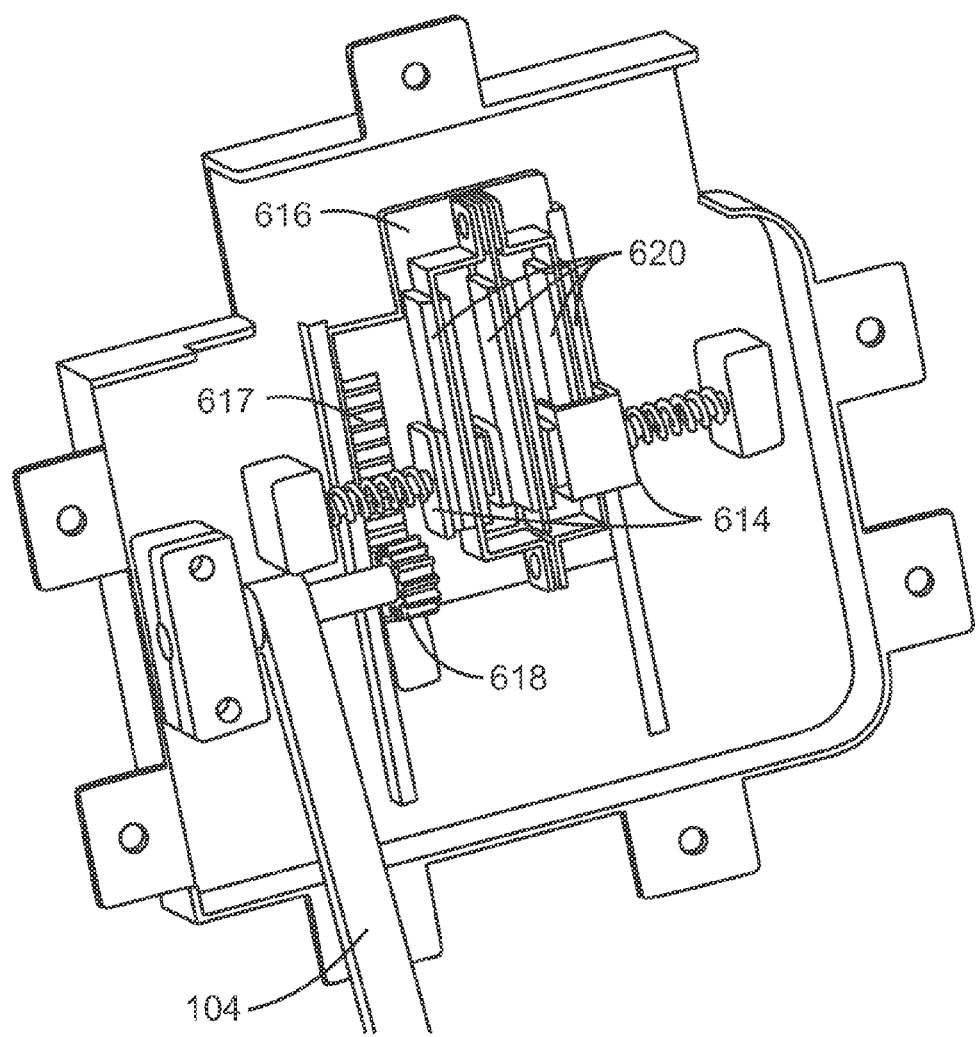
FIG. 6C is a perspective view of a third embodiment of a mechanical rotation mechanism in which friction calipers are used to lock the position of the portable computing device.

FIG. 6C is a perspective view of a third embodiment of the mechanical rotation mechanism 502 in which friction calipers are used to lock the position of the portable computing device. The view shown in FIG. 6C is generally referred to by the reference number 600C. In FIG. 6C, friction calipers 614 are used to arrest movement of the stand 104. The stand 104 is coupled to a slider 616 by the use of a rack 617 and pinion 618 arrangement. The rotation of the stand 104 is prevented by locking the slider 616 movement. A set of friction pads 620 are used to engage and disengage the slider 616. When the pads 620 are engaged, the slider 616 movement is stopped. To increase the effectiveness of the friction pads 620, multiple sets of friction pads 620 are used.

Figure 7:
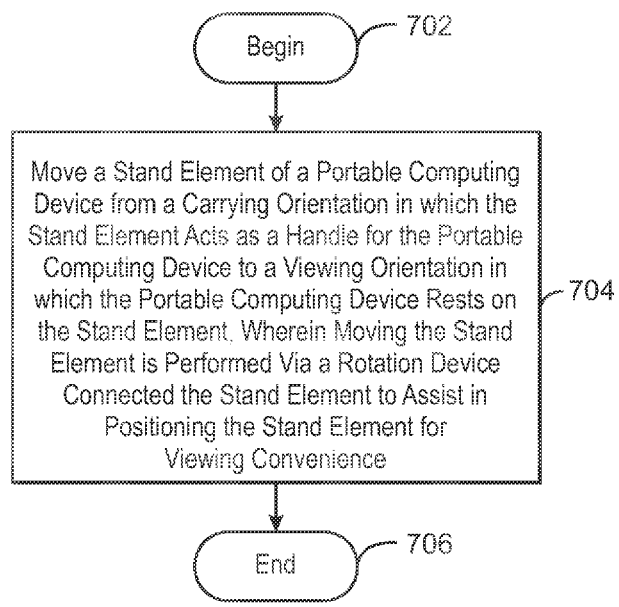
FIG. 7 is a process flow diagram showing an exemplary method of positioning a portable computing device in accordance with the subject innovation.

FIG. 7 is a process flow diagram showing an exemplary method of positioning the portable computing device 100 in accordance with the subject innovation. The process is generally referred to by the reference number 700.

At block 702, the process begins. In an embodiment, the portable computing device 100 includes the body 102 and a stand element 104 coupled to the body 102 for rotating motion. At block 704, the stand element 104 is moved from a carrying orientation in which the stand element 104 acts as a handle for the portable computing device 100 to a viewing orientation in which the portable computing device 100 rests on the stand element 104. As described in embodiments herein, the stand element 104 is moved via the rotation device 108 connected the stand element 104 to assist in positioning the stand element 104 for viewing convenience. At block 706, the process ends.

Figure 8:
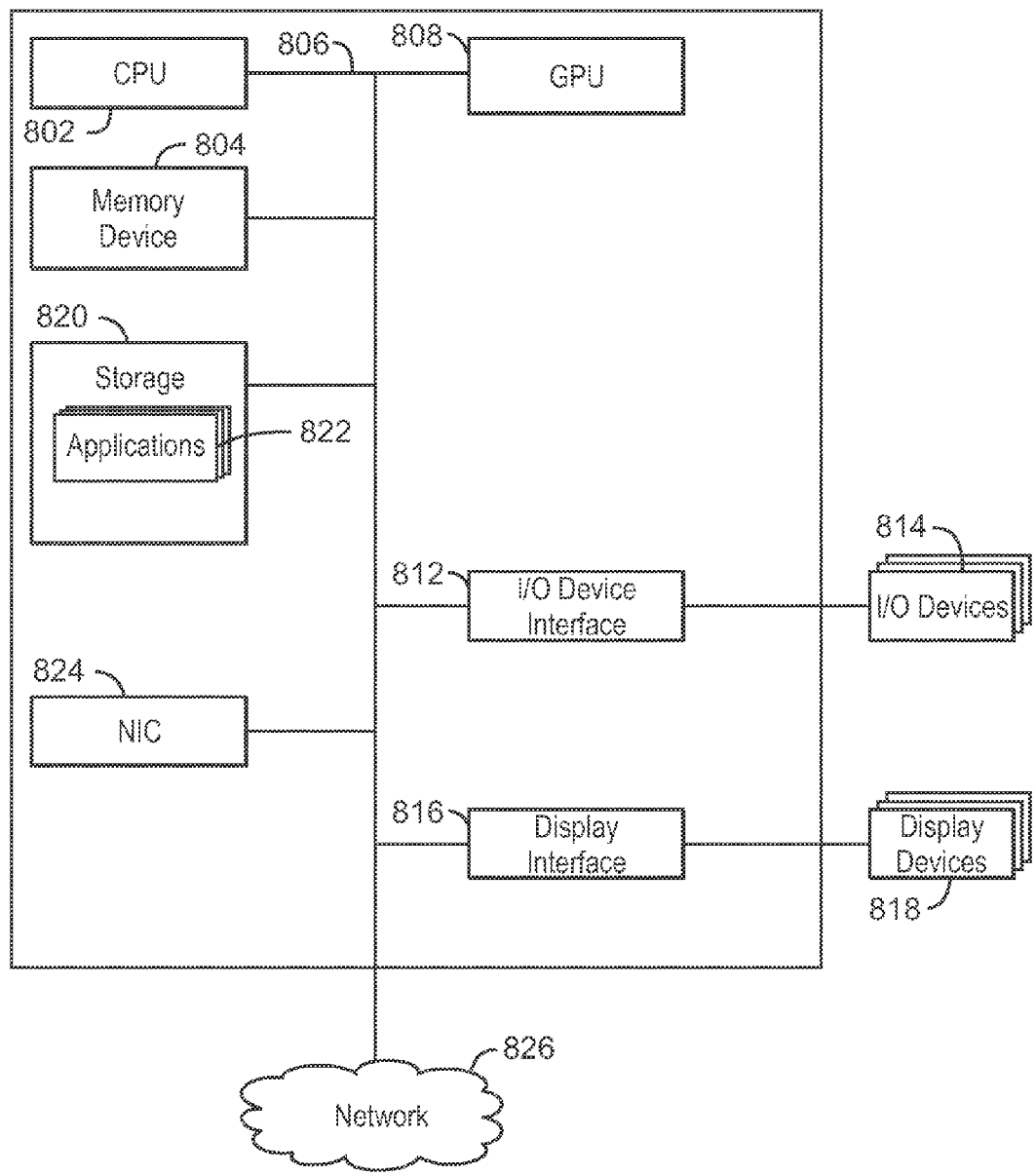
FIG. 8 is a block diagram of a computing device that may be used in accordance with the subject innovation.

FIG. 8 is a block diagram of a computing device 800 that may be used to process data for voice recognition. The computing device 800 may be, for example, a laptop computer, desktop computer, ultrabook, tablet computer, mobile device, or server, among others. The computing device 800 may include a central processing unit (CPU) 802 that is configured to execute stored instructions, as well as a memory device 804 that stores instructions that are executable by the CPU 802. The CPU may be coupled to the memory device 804 by a bus 806. Additionally, the CPU 802 can be a single core processor, a multi-core processor, a computing cluster, or any number of other configurations. Furthermore, the computing device 800 may include more than one CPU 802. The memory device 804 can include random access memory (RAM), read only memory (ROM), flash memory, or any other suitable memory systems. For example, the memory device 804 may include dynamic random access memory (DRAM).

The computing device 800 may also include a graphics processing unit (GPU) 808. As shown, the CPU 802 may be coupled through the bus 806 to the GPU 808. The GPU 808 may be configured to perform any number of graphics operations within the computing device 800. For example, the GPU 808 may be configured to render or manipulate graphics images, graphics frames, videos, or the like, to be displayed to a user of the computing device 800.

The CPU 802 may also be connected through the bus 806 to an input/output (I/O) device interface 812 configured to connect the computing device 800 to one or more I/O devices 814. The I/O devices 814 may include, for example, a keyboard and a pointing device, wherein the pointing device may include a touchpad or a touchscreen, among others. The I/O devices 814 may be built-in components of the computing device 800, or may be devices that are externally connected to the computing device 800. In some examples, an I/O device 814 may be a microphone. The CPU 802 may also be linked through the bus 806 to a display interface 816 configured to connect the computing device 800 to a display device 818. The display device 818 may include a display screen that is a built-in component of the computing device 800, such as in an AIO. The display device 818 may also include a computer monitor, television, or projector, among others, that is externally connected to the computing device 800.

The computing device also includes a storage device 820. The storage device 820 is a physical memory such as a hard drive, an optical drive, a thumbdrive, an array of drives, or any combinations thereof. The storage device 820 may also include remote storage drives. A number of applications 822 may be stored on the storage device 820. The applications 822 may include a voice recognition application. Additionally, a codec library may be stored on the storage device 820. The codec library may include various codecs for the processing of audio data. A codec may be a software or hardware component of a computing device that can encode or decode a stream of data. In some cases, a codec may be a software or hardware component of a computing device that can be used to compress or decompress a stream of data. In embodiments, the codec library includes an audio codec that can process multi-channel audio data. Pre-processing the multi-channel audio data may implement voice recognition in various modes, including lay-flat and up-right. The lay-flat mode is when the computing device is in a lay-flat position, while up-right mode occurs when the computing device is in an up-right position.

In any mode, the multi-channel audio data can be separated using blind source separation. Voice recognition may be performed when one or more channels are selected from the multi-channel audio data after blind source separation has been performed. This initial voice recognition may be used with a small database of recognized words. Adaptive beam forming may be applied to the selected one or more channels, and full voice recognition may be performed on the selected one or more channels.

The computing device 800 may also include a network interface controller (NIC) 824 may be configured to connect the computing device 800 through the bus 806 to a network 826. The network 826 may be a wide area network (WAN), local area network (LAN), or the Internet, among others.

The block diagram of FIG. 8 is not intended to indicate that the computing device 800 is to include all of the components shown in FIG. 8. Rather, the computing system 800 can include fewer or additional components not illustrated in FIG. 8 (e.g., sensors, power management integrated circuits, additional network interfaces, etc.). The computing device 800 may include any number of additional components not shown in FIG. 8, depending on the details of the specific implementation. Furthermore, any of the functionalities of the CPU 802 may be partially, or entirely, implemented in hardware and/or in a processor. For example, the functionality may be implemented with an application specific integrated circuit, in logic implemented in a processor, in logic implemented in a specialized graphics processing unit, or in any other device.

EXAMPLE 1

A portable computing device includes a body that includes a display and a stand connected to the body. The stand is operable to place the portable computing device in a viewing orientation in which the portable computing device rests on the stand or a carrying orientation in which the stand acts as a handle for lifting the portable computing device. The portable computing device also includes a rotation device connected to the stand to assist in positioning the display in a range of angles for viewing convenience. The portable computing device may include a sensor to detect an attempt to reposition the portable computing device and to automatically activate the rotation device in response to detecting the attempt. The range of angles may have a resolution of about 2°. The rotation device may include a motor that automatically moves the rotation device in response to an attempt to reposition the portable computing device. The rotation device may include a mechanical rotation mechanism and an engagement mechanism that prevents rotation of the rotation device when the mechanical rotation mechanism is in a disengaged state. The portable computing device may be positionable in an interim usage orientation. The portable computing device may include a recess in the body of the portable computing device, the recess being adapted to receive and secure the stand when in the carrying orientation.

EXAMPLE 2

A stand element for use with a portable computing device may be movable from a carrying orientation in which the stand element acts as a handle for the portable computing device to a viewing orientation in which the portable computing device rests on the stand element. The stand element may be moved via a rotation device connected the stand element to assist in positioning a display of the portable computing device for viewing convenience. A sensor of the portable computing device detects an attempt to reposition the portable computing device and automatically activates the rotation device in response to detecting the attempt. The portable computing device may be positioned within a range of positions having a resolution of about 2°. A motor associated with the rotation device automatically moves the rotation device in response to an attempt to reposition the portable computing device. A mechanical rotation mechanism associated with the rotation device is controlled by an engagement mechanism that prevents rotation of the rotation device when the mechanical rotation mechanism is in a disengaged state. The stand element of the portable computing device is positionable in an interim usage orientation. The stand element is positionable in a recess in a body of the portable computing device, the recess being adapted to receive and secure the stand element when in the carrying orientation.

EXAMPLE 3

A method of positioning a portable computing device described herein. The portable computing device has a body and a stand element coupled to the body for rotating motion. The method includes moving the stand element from a carrying orientation in which the stand element acts as a handle for the portable computing device to a viewing orientation in which the portable computing device rests on the stand element. Moving the stand element is performed via a rotation device connected the stand element to assist in positioning the stand element for viewing convenience. The method may include detecting an attempt to reposition the portable computing device and automatically activating the rotation device in response to detecting the attempt. The portable computing device may be positioned within a range of positions having a resolution of about 2°. The method may include moving the rotation device in response to an attempt to reposition the portable computing device. The method may include controlling a mechanical rotation mechanism associated with the rotation device using an engagement mechanism that prevents rotation of the rotation device when the mechanical rotation mechanism is in a disengaged state. The method may include positioning the stand element of the portable computing device in an interim usage orientation. The method may include positioning the stand element in a recess in a body of the portable computing device, the recess being adapted to receive and secure the stand element when in the carrying orientation.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A portable computing device, comprising:
    a body that includes a display;
    a stand connected to the body, the stand being operable to place the portable computing device in a viewing orientation in which the portable computing device rests on the stand, a carrying orientation in which the stand acts as a handle for lifting the portable computing device, and the stand operable to be secured in a recess and the portable computing device operable as a tablet;
    a rotation device connected to the stand to assist in positioning the display in a range of angles for viewing convenience; and
    a sensor to detect an attempt to reposition the portable computing device and to automatically activate the rotation device in response to detecting the attempt, wherein the sensor is a gyroscope sensor.

2. The portable computing device of claim 1, comprising a sensor to detect an attempt to reposition the portable computing device and to automatically activate the rotation device in response to detecting the attempt.

3. The portable computing device of claim 1, wherein the range of angles has a resolution of about 2°.

4. The portable computing device of claim 1, wherein the rotation device comprises a motor that automatically moves the rotation device in response to an attempt to reposition the portable computing device.

5. The portable computing device of claim 1, wherein the rotation device comprises a mechanical rotation mechanism and an engagement mechanism that prevents rotation of the rotation device when the mechanical rotation mechanism is in a disengaged state.

6. The portable computing device of claim 1, wherein the portable computing device is positionable in an interim usage orientation.

7. The portable computing device of claim 1, wherein the recess is adapted to receive and secure the stand when in the carrying orientation.

8. A stand element for use with a portable computing device, the stand element being movable from a carrying orientation in which the stand element acts as a handle for the portable computing device to a viewing orientation in which the portable computing device rests on the stand element, and the stand operable to be secured in a recess and the portable computing device operable as a tablet, wherein the stand element is moved via a rotation device connected to the stand element to assist in positioning a display of the portable computing device for viewing convenience, and a sensor to is detect an attempt to reposition the portable computing device and to automatically activate the rotation device in response to detecting the attempt, wherein the sensor is a gyroscope sensor.

9. The stand element of claim 8, wherein a sensor of the portable computing device detects an attempt to reposition the portable computing device and automatically activates the rotation device in response to detecting the attempt.

10. The stand element of claim 8, wherein the portable computing device may be positioned within a range of positions having a resolution of about 2°.

11. The stand element of claim 8, wherein a motor associated with the rotation device automatically moves the rotation device in response to an attempt to reposition the portable computing device.

12. The stand element of claim 8, wherein a mechanical rotation mechanism associated with the rotation device is controlled by an engagement mechanism that prevents rotation of the rotation device when the mechanical rotation mechanism is in a disengaged state.

13. The stand element of claim 8, wherein the stand element of the portable computing device is positionable in an interim usage orientation.

14. The stand element of claim 8, wherein the recess is adapted to receive and secure the stand element when in the carrying orientation.

15. A method of positioning a portable computing device, the portable computing device having a body and a stand element coupled to the body for rotating motion, the method comprising:
    moving the stand element from a carrying orientation in which the stand element acts as a handle for the portable computing device to a viewing orientation in which the portable computing device rests on the stand element, and further to a securing the stand element in a recess where the portable computing device is operable as a tablet, wherein moving the stand element is performed via a rotation device connected to the stand element to assist in positioning the stand element for viewing convenience and a sensor is to detect an attempt to reposition the portable computing device and to automatically activate the rotation device in response to detecting the attempt, wherein the sensor is a gyroscope sensor.

16. The method of claim 15, comprising detecting an attempt to reposition the portable computing device and automatically activating the rotation device in response to detecting the attempt.

17. The method of claim 15, wherein the portable computing device may be positioned within a range of positions having a resolution of about 2°.

18. The method of claim 15, comprising moving the rotation device in response to an attempt to reposition the portable computing device.

19. The method of claim 15, comprising controlling a mechanical rotation mechanism associated with the rotation device using an engagement mechanism that prevents rotation of the rotation device when the mechanical rotation mechanism is in a disengaged state.

20. The method of claim 15, comprising positioning the stand element of the portable computing device in an interim usage orientation.

21. The method of claim 15, wherein the recess is adapted to receive and secure the stand element when in the carrying orientation.

* * * * *